(12) United States Patent
Hanlon et al.

(10) Patent No.: US 6,260,869 B1
(45) Date of Patent: *Jul. 17, 2001

(54) MOTORCYCLE FRONT SUSPENSION SYSTEM

(75) Inventors: Daniel L. Hanlon, Burnsville; David P. Hanlon, Apple Valley; James A. Holroyd, Edina, all of MN (US)

(73) Assignee: Excelsior-Henderson Motorcyle Co., Belle Plaine, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/126,364

(22) Filed: Jul. 30, 1998

Related U.S. Application Data
(60) Provisional application No. 60/054,368, filed on Jul. 31, 1997.

(51) Int. Cl.[7] ....................................................... B62L 5/00
(52) U.S. Cl. ............................................... 280/276; 188/26
(58) Field of Search ..................................... 280/277, 276, 280/279, 275, 283, 124.104, 124.105; 188/26, 17, 24.11, 24.12

(56) References Cited

U.S. PATENT DOCUMENTS

| | | | |
|---|---|---|---|
| 940,245 | * 11/1909 | Gates . | |
| 1,101,614 | * 6/1914 | Bramham . | |
| 2,969,992 | * 1/1961 | Hahn . | |
| 4,184,695 | 1/1980 | Roe et al. | 280/277 |
| 4,211,454 | 7/1980 | Mitchell et al. | 308/26 |
| 4,421,337 | * 12/1983 | Pratt . | |
| 4,775,163 | 10/1988 | McGowan et al. | 280/277 |
| 4,776,609 | * 10/1988 | Pan et al. | 280/703 |
| 5,186,274 | 2/1993 | Hegman | 180/227 |

* cited by examiner

Primary Examiner—Anne Marie Boehler
(74) Attorney, Agent, or Firm—Russell D. Slifer; Fogg, Slifer & Polglaze, P.A.

(57) ABSTRACT

A motorcycle uses a unique suspension system to reduce front end dive during braking. Anti-dive characteristics through full suspension travel provides a smoother ride by reducing the compression damping used in the suspension. The suspension system incorporates a rigid fork, a compression fork and a rocker arm. The front wheel is mounted to the rocker arm such that an axis of the wheel is located along the rocker arm between the rigid fork and the compression fork. A brake is coupled to the axis of the front wheel with a first support member and is connected to the rigid fork with a second support member. A brake linkage which includes a portion of the rigid fork, the rocker arm, and the first and second support members forms an irregular quadrilateral during vertical movement of the front wheel, such that a centerline of the second support member and a centerline of the rocker arm intersect behind the front wheel axis. By positioning the centerline intersection behind the front wheel during complete suspension travel, a feedback force is provided to raise the front end and counter act a compression force created by weight transfer.

6 Claims, 4 Drawing Sheets

MOTORCYCLE FRONT SUSPENSION SYSTEM

This application claims benefit of provisional Application No. 60/054,368 filed Jul. 31, 1997.

TECHNICAL FIELD OF THE INVENTION

The present invention relates generally to motorcycles and in particular the present invention relates to a motorcycle front suspension system.

BACKGROUND OF THE INVENTION

Excelsior-Henderson Motorcycle Co. began producing motorcycles in the early 1900's. The early generation motorcycles included a front suspension system which incorporated a leading-link system. The leading-link system was based on a cantilever design where the axle of the front wheel was positioned in front of both rigid forks and spring forks. Although the system performed exceptionally well for motorcycles of that era, modern motorcycles are substantially larger and more powerful than their predecessors. As such, there is a need for an improved suspension and braking system compatible with today's motorcycle designs.

The performance of a motorcycle front suspension system is critical to both safety and operator comfort. With regard to safety, the front suspension system plays an important role in braking and steering. The front suspension system also contributes to rider comfort by absorbing shocks experienced during operation, and stabilizes the motorcycle during braking.

During braking operations, forward momentum of the motorcycle and its rider compress the front suspension. By compressing the front suspension during braking, the motorcycle rider experiences a diving sensation. To counteract this front end compression, the front suspension shock absorbing system can be adjusted to provide more compression damping, thereby resisting compression during braking. By increasing the stiffness of the front suspension, however, rider comfort is sacrificed during normal operation.

Different motorcycle front suspension systems have been described which attempt to reduce the amount of front end dive which is experienced during braking. For example, U.S. Pat. No. 4,775,163 issued Oct. 4, 1988 describes a motorcycle front suspension system which includes a leading link system having a rigid fork, a spring fork, and a rocker member. The rigid fork is attached to one end of the rocker member, and a front wheel axle is attached to an opposite end of the rocker member. The spring fork is attached to the rocker member at an intermediate location between the rigid fork and the spring fork. The suspension system also includes a brake caliper located in front of the spring fork and attached to both the front wheel axle and to the rigid fork through a link member. The patent describes the configuration as approximating a parallelogram having as its sides a segment of rigid fork, the rocker member, the brake caliper, and the link. It is asserted that when the front brake is applied and momentum drives the spring fork downward, the link induces a force up the rigid fork to increase the resistance of the suspension to retard "diving" of the motorcycle's front end.

U.S. Pat. No. 4,184,695 issued Jan. 22, 1980 also describes a motorcycle front fork assembly which includes a leading link suspension having a rigid fork, a spring suspension device and a link. Again, the rigid fork is attached to one end of the link and a front wheel axis is attached to an opposite end of the link. The spring suspension device is attached part way along the link between the rigid fork and the front wheel axis. A brake caliper is positioned in front of the spring suspension device and is attached to the rigid fork using a torque arm. The rigid fork, link, brake caliper and torque arm form a parallelogram. During braking, a force is exerted downward on the front wheel thereby reducing front end dive. The suspension systems described in the U.S. Pat. Nos. 4,184,695 and 4,775,163 place high stresses on the linkage components by locating the front wheel axis in front of both the rigid and spring forks. Further, these systems do not provide anti-dive characteristics through full suspension travel. That is, the suspension systems behave differently when the brakes are applied at different times during travel of the suspension.

For the reasons stated above, and for other reasons stated below which will become apparent to those skilled in the art upon reading and understanding the present specification, there is a need in the art for a smoother suspension system which reduced component stress while reducing suspension compression due to braking operations.

SUMMARY OF THE INVENTION

The above mentioned problems with suspension systems and other problems are addressed by the present invention and will be understood by reading and studying the following specification. A front suspension system is described which reduces front end dive during braking operation.

In particular, the present invention describes a motorcycle comprising a frame, a steering head pivotally attached to the frame, a rigid fork downwardly extending from the steering head, and a compression fork downwardly extending from the steering head. A rocker arm is provided which has a first end pivotally connected to the rigid fork and an opposite end pivotally connected to the compression fork. A front wheel is rotatably mounted to the rocker arm such that an axis of the wheel is located along the rocker arm between the first and second ends.

In another embodiment, a motorcycle front suspension system comprises a rigid fork downwardly extending from the steering head, a compression fork downwardly extending from the steering head, and a rocker arm having a first end pivotally connected to the rigid fork and an opposite end pivotally connected to the compression fork. A front wheel is rotatably mounted to the rocker arm such that an axis of the wheel is located along the rocker arm between the first and second ends. A brake is located between the rigid fork and the compression fork. The brake is coupled to the axis of the front wheel with a first support member and is coupled to the rigid fork with a second support member, such that a portion of the rigid fork, the rocker arm, and the first and second support members form an irregular quadrilateral during vertical movement of the front wheel. A centerline of the second support member and a centerline of the rocker arm intersect behind the front wheel axis.

A method of reducing front end dive in a motorcycle having a rigid fork and a compression fork is described. The method comprises providing a front brake coupled to a front wheel axis and the rigid fork, and providing an upward feedback force to the rigid fork from the front brake during braking operations to compensate for a weight transfer to a front end of the motorcycle during a complete travel range of the compression fork.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical and mechanical changes may be made without departing from the spirit and scope of the present inventions. The following detailed description is, therefore, not to be taken in a limiting sense, and the scope of the present invention is defined only by the appended claims.

A motorcycle suspension system is described herein which reduces front end dive during braking operations. The system reduces the need for increased compression damping, thereby increasing shock absorption during normal operation to provide a smooth ride. The suspension system is a leading link suspension having a front wheel axis located along a rocker member, and between pivot points of a rigid fork and an absorbing fork. A brake is located between the rigid fork and the absorbing fork, and mounted in such a manner as to reduce compression of the absorbing fork during braking. The reduction in compression counteracts weight transfer during braking to maintain a full anti-dive system.

During braking operations, a weight transfer toward the front wheel is experienced. This weight transfer is a function of the deceleration of the motorcycle and can be expressed as:

$$Wt = \frac{m * a * \bar{y}}{Wb}$$

where m is the mass of the motorcycle and rider, a is the deceleration rate, y-bar is the height of the center of gravity, and Wb (wheel base) is the distance between the contact points of each wheel. Under hard braking, the weight transfer to the front wheel will approach Wt while the weight applied to the rear wheel approaches zero.

Figure 1:
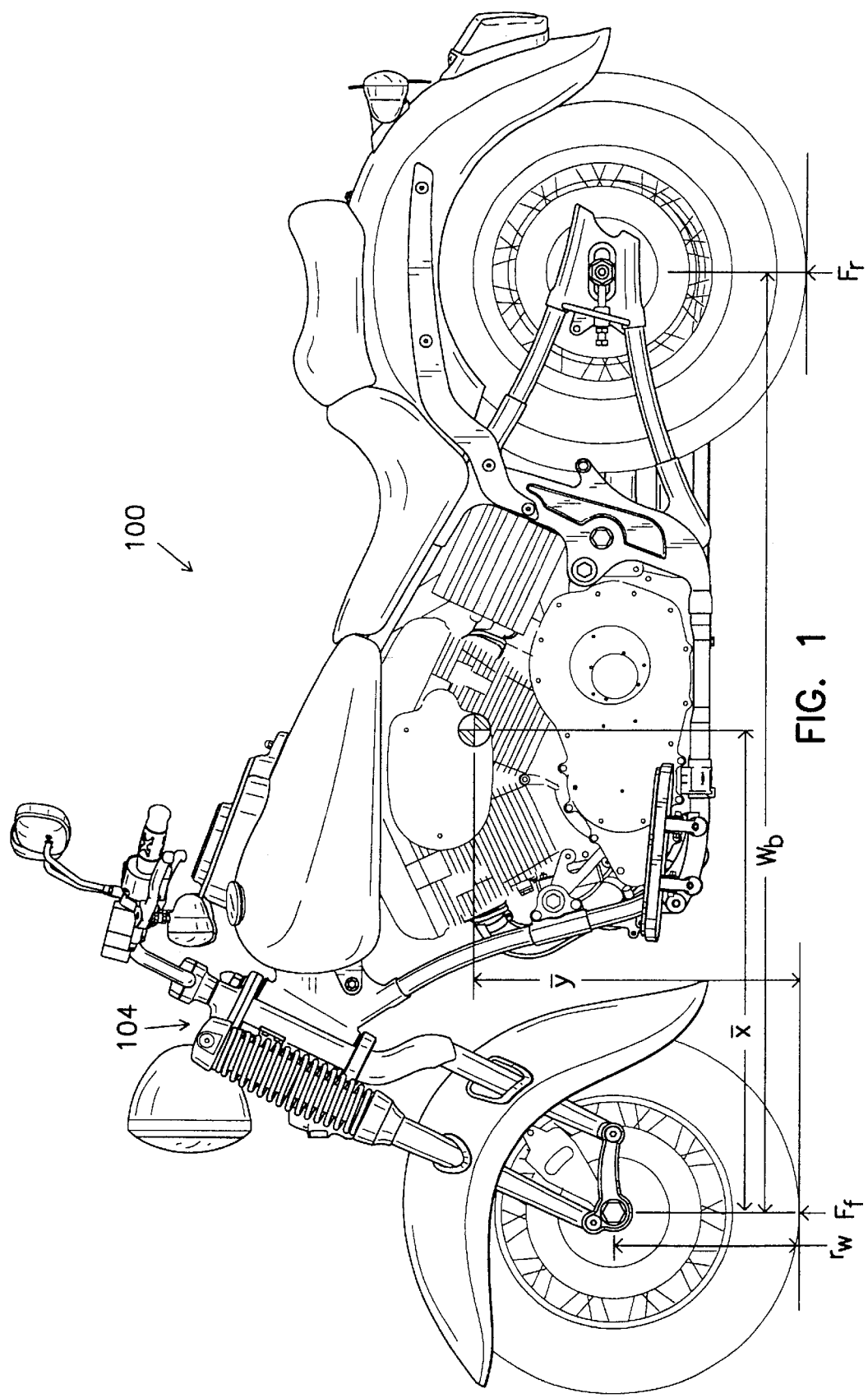
FIG. 1 illustrates a motorcycle having an anti-dive suspension system.
Figure 2:
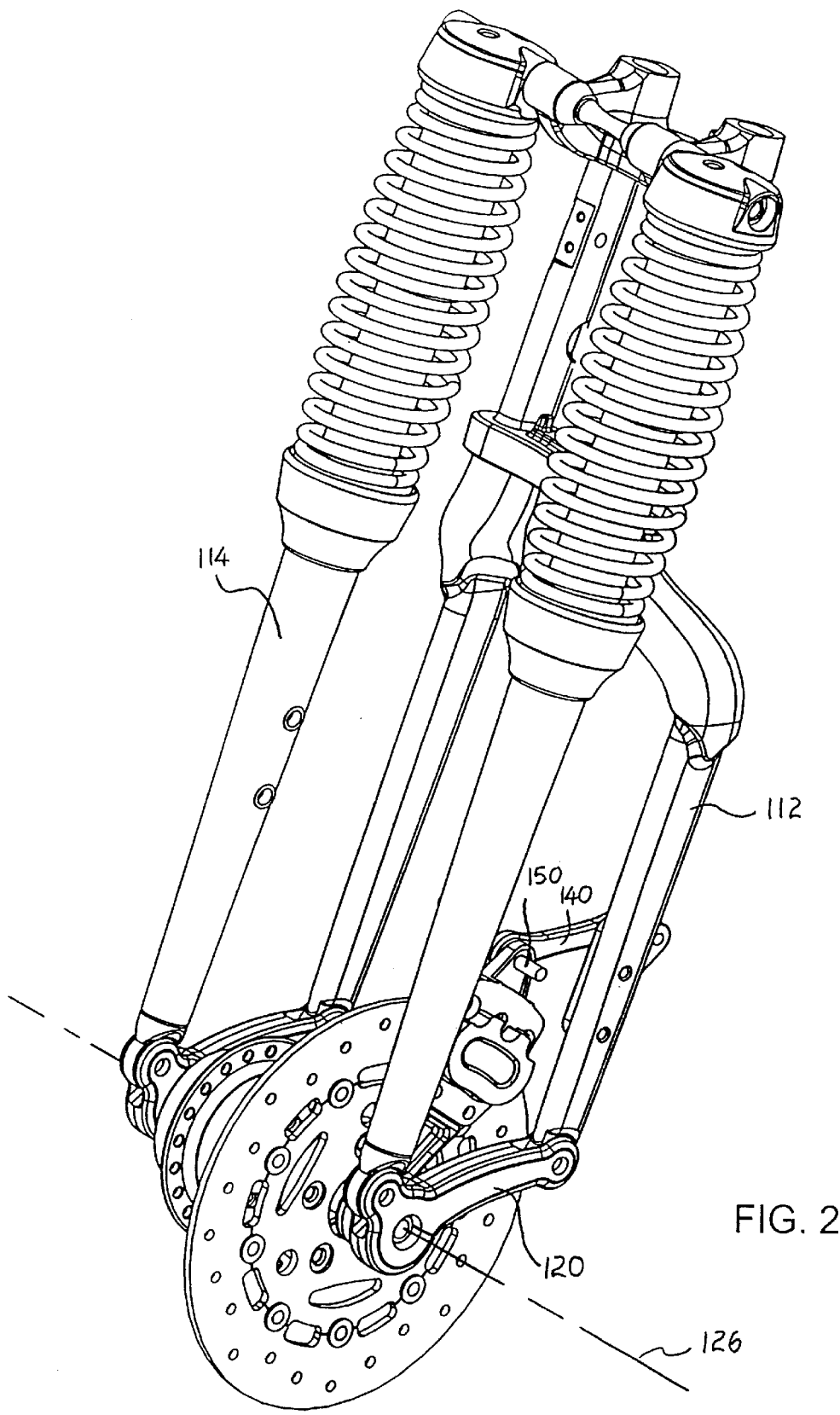
FIG. 2 is a perspective view of one embodiment of a motorcycle suspension.
Figure 3:
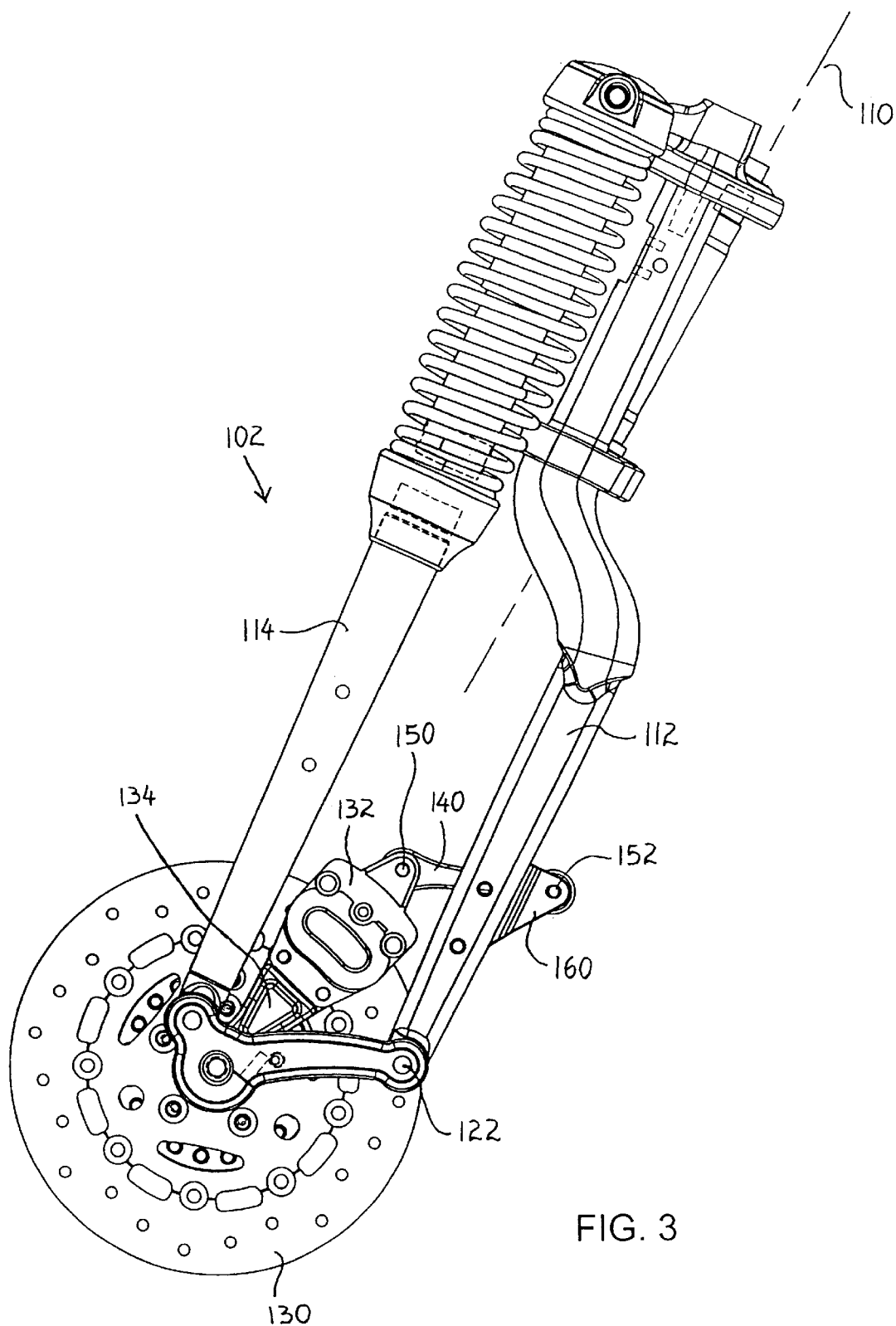
FIG. 3 illustrates one embodiment of a brake linkage.

Referring to FIGS. 1, 2 and 3 a motorcycle 100 and a front suspension system 102 of the motorcycle are illustrated in a steady state mode with no rider on the motorcycle and no external forces acting upon the suspension. The motorcycle includes a steering head 104 which is attached to the frame 106 of the motorcycle and allows movement of the front wheel about a steering axis 110. Attached to the steering head is a pair of rigid forks 112 and a pair of hydraulic/spring dampened shocks 114, referred to herein as a compression fork. The rigid forks and the compression forks downwardly extend from the steering head in parallel. Attached to a lower end of the rigid forks and the compression forks are a pair of rocker arms 120. Each rocker arm is mounted to both the rigid fork at 122 and the compression fork at 114 to allow pivoting. Thus, a bearing is preferably provided at the pivot locations.

The rocker arms attach to an axis 126 of the front wheel. Again, the wheel is mounted to allow free rotation about its axis. The mounting point of the front wheel axis is located laterally between the mounting points 122 and 124, respectively, of the rigid forks and the compression forks. The rigid fork, therefore, provides a pivot point for the rocker arm and the compression fork absorbs vertical movement of the wheel. As known to those skilled in the art, it is desired function of the compression fork to isolate the vertical movements of the wheel from the motorcycle frame during operation.

The front brake system includes a disk 130, a brake and caliper housing 132, a caliper mounting bracket 134 coupled to the axis 126 of the front wheel, and a caliper rod 140 attached to the rigid fork. The caliper housing and caliper mounting bracket are preferably assembled together to form a common member. That is, the caliper housing and caliper mounting bracket do not move relative to each other. For purposes of understanding the present invention, the combination of the caliper and caliper mounting bracket are considered one support member for the brake. It will be appreciated by those skilled in the art that a singular support bracket Could be used which attaches to the brake, and the present invention is not limited to a support bracket which includes a portion of the caliper bracket.

The caliper rod 140 coupled to both the brake support member at 150 and the rigid fork at 152 to allow pivoting of the rod. Thus, the rod is preferably attached at both ends using bearings. It is noted that a mounting plate 160 can be used to couple the rod and rigid fork together. Alternately, the rod and rigid fork can be directly connected. A portion of the rocker arm between 122 and 126, the brake support bracket from 126 to 150, the caliper rod 140, and a portion of the rigid fork from 152 to 122 form a braking subsystem which defines links W, X, Y and Z, respectively, as illustrated in FIG. 4A.

During braking, the weight transfer acts upon the motorcycle front end to compress the dampened shock 114. If the forces exerted by the brake system are taken into consideration, the resultant effect of the compression applied to the compression fork is altered. A motorcycle suspension is considered neutral during braking when compression of the suspension is due to weight transfer. A motorcycle suspension is considered "pro-dive" during braking when compression of the suspension is increased beyond the effect of weight transfer. In other words, the suspension is compressed by both weight transfer and forces which result from braking. A motorcycle suspension is considered "anti-dive" during braking when compression of the suspension is less than the effect of weight transfer. Thus, the suspension experiences a compression force due to weight transfer and a counter force resulting from braking which reduces total compression.

Figure 4A:
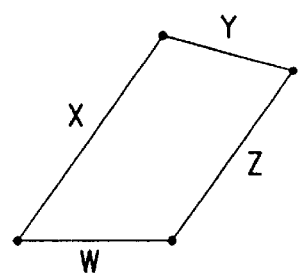
FIG. 4A is a representative illustration of one embodiment of a brake linkage.

Referring to FIG. 4A, links W, X, Y and Z can be arranged in different geometric shapes to transfer forces to the suspension system in different manners. As explained below, the suspension will have pro-dive characteristics if the center lines of links W and Y intersect at or in front of the front wheel axis. If the center lines do not cross, the suspension is neutral. If the caliper rod were connected to the bottom 122 of the rigid fork (Z=0) the brake subsystem would form a triangle and be strongly anti-dive. This is due to the transfer of the braking torque into an upward force on the rigid fork. Conversely, links W and Y could be selected and positioned to be parallel to each other to provide a neutral suspension. If the links are selected improperly, such that the link center lines intersect in front of the wheel axis, a pro-dive suspension is created. It is important to note that as the suspension travels, the intersection location of the center lines changes and the present invention controls these locations to provide a continuous anti-dive system.

Figure 4B:
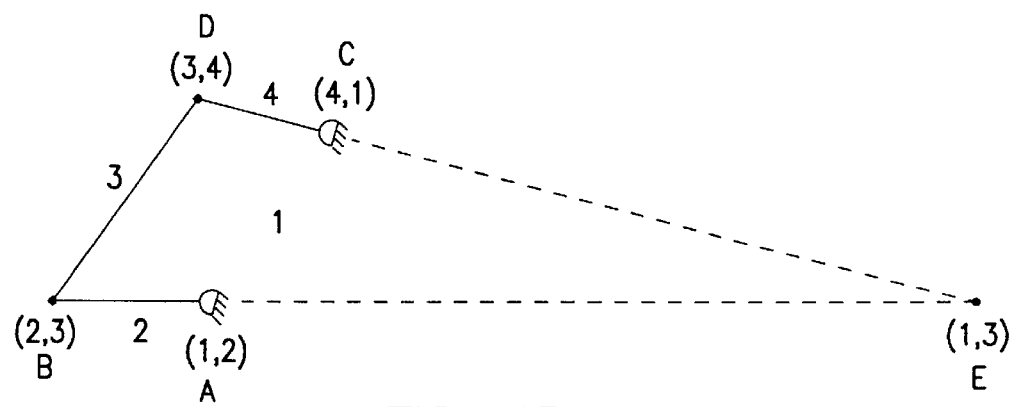
FIG. 4B illustrates a kinematic representation of a front brake subsystem.

In the preferred embodiment, links W and Y are selected and positioned such that a "center line" of each component intersects at a location behind the front wheel during the full travel of the front suspension. It will be appreciated that the "center line" of each link is defined by a line passing through the pivot or mounting locations connecting the links. Thus, a geometric centerline of the link is not described herein. FIG. 4B illustrates a kinematic representation of the front brake subsystem where the connections to link Z (rigid fork) are shown as stationary points, or ground pivots. The following is a description of a technique used to determine the length of the links of the subsystem.

A torque is applied to the rigid forks as the brakes are applied. Using four instant centers of the linkage, the mechanical advantage of the system can be determined. The mechanical advantage of the sub-loop brake system is defined as:

$$MA = \frac{\omega 3}{\omega 2} = \frac{T_2}{T_3}; T_2 = Fout * r_{out}; T_3 = T_{input}$$

$$\frac{Fout * r_{out}}{Tinput} = \frac{\omega 3}{\omega 2}$$

$$Fout = \frac{Tinput}{(1,2)-(2,3)} * \frac{(1,2)-(2,3)}{(1,3)-(2,3)} = \frac{Tinput}{(1,3)-(2,3)}$$

Wherein (1,2)-(2,3) is the distance between point (1,2) and point (2,3), and (1,3)-(2,3) is the distance between point (1,3) and point (2,3). Point (1,2) is also referred to as point A, point (2,3) is also referred to as point B, and (1,3) is also referred to as point E. The unit of measure used to define the distances is not critical to the present invention. The force output on the rigid fork by the brake system is the force which is applied to the front wheel axis, and is controlled by the brake torque input. Therefore, considering the torque input to the brake link during braking and taking the moment about the base of the wheel, the brake torque during hard braking is defined by:

Brake Torque $(Tb)=F_{brake}*rw;$ where $r_w$ is the height of the front axis, $F_{brake}=m*a$ $\therefore Tb=rw*m*a$ If the weight transfer is equal to the force exerted upwardly on the rigid fork, the suspension system is operating as an anti-dive system. Thus, the ratio of Fout to the weight transfer as a function of the intersection point (1,3) sets the dive ratio, x,:

$$\text{Dive Ratio } x = \frac{Fout}{Wt} = \frac{\frac{Tb}{(1,3)-(2,3)}}{\frac{m*a*\bar{y}}{Wb}}$$

$$x = \frac{rw*Wb}{((1,3)-(2,3))*\bar{y}}$$

The location, therefore, of intersection (1,3) is important. By properly placing this intersection during full suspension travel, the suspension system can fully operate as an anti-dive suspension. That is, by maintaining a controlled feedback force from the braking system through full suspension travel, the weight transfer to the front wheel is offset. It will be appreciated that if (1,3) approaches infinity (links W and Y are parallel) the dive ratio, x, approaches zero and the front end dive is controlled by the compression forks. Further, as (1,3) approaches zero, the dive ratio approaches infinity such that the front end rises and over compensates for the weight transfer. In one embodiment, the dive ratio x remains close to unity through suspension travel. A relatively constant ratio in the range of 0.9 to 1.1 is expected to provide a comfortable ride for the motorcycle.

Because the location of the intersection of the links is critical to suspension performance, both the length and location of the links are significant. Thus, the intersection of the linkage during full suspension travel must remain close to unity. It is important to note that the initial position of the brake sub-loop does not fully characterize the suspension performance during operation. For example, a basic analysis of a motorcycle design having a suspension similar to the system described in U.S. Pat. No. 4,775,163, set forth above in the Background section, indicated that the effect on motorcycle dive varies dramatically during suspension travel. That is, while the suspension was initially neutral to motorcycle dive (x≈0), the motorcycle suspension performance varied between pro-dive, neutral and anti-dive operations during suspension travel; which is an undesirable suspension performance.

In one embodiment, the brake linkage sub-loop is an irregular quadrilateral having link lengths W, X, Y and Z which are 5.178, 6.566, 4.520 and 7.578 inches, respectively. In more general terms, W=1.15Y, X=1.45Y and Z=1.67Y. This configuration provides an intersection point (1,3) which is approximately 30–40 inches behind the front axis during suspension operation. In one embodiment, the intersection is around 32–36 inches for a motorcycle having a wheel base of 65 inches, a front wheel axle height of about 12.2 inches, and a center of gravity of about 21 inches. This design provides compensation during braking which very closely matches the weight transfer during deceleration. The intersection point of the center lines of the two links will tend to be behind the front wheel and in front of the rear wheel, although not limited to such a design. In particular, the intersection point is located in the general area of a horizontal position of the center of gravity of the motorcycle (x-bar shown in FIG. 1). As such, it is anticipated that a motorcycle with a center of gravity which is located closer to the front wheel will also require a suspension intersection location closer to the front wheel. It will be appreciated by those skilled in the art that many variables effect the exact measurement of the link lengths, such as the angle of the forks, and that the present invention is only limited by the appended claims.

CONCLUSION

A motorcycle has been described which uses a unique suspension system to reduce front end dive during braking. By providing anti-dive characteristics through full suspension travel, a smoother ride can be provided by reducing the compression used in the suspension. The suspension system incorporates a rigid fork, and a rocker arm having a first end connected to the rigid fork and an opposite end connected to a compression fork. The front wheel is mounted to the rocker arm such that an axis of the wheel is located along the rocker arm between its first and second ends. A brake is coupled to the axis of the front wheel with a first support member and is connected to the rigid fork with a second support member. A brake linkage has been described which includes a portion of the rigid fork, the rocker arm, and the first and second support members. The linkage forms an irregular quadrilateral during vertical movement of the front wheel, such that a centerline of the second support member and a centerline of the rocker arm intersect behind the front wheel axis. By positioning the centerline intersection behind the front wheel during complete suspension travel, a feedback force is provided to raise the front end and counter act a compression force created by weight transfer.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A motorcycle comprising:

a frame;

a steeling head pivotally attached to the frame;

a rigid fork downwardly extending from the steering head;

a compression fork downwardly extending from the steering head;

a rocker arm having a first end pivotally connected to the rigid fork and an opposite end pivotally connected to the compression fork;

a front wheel rotatably mounted to the rocker arm such that an axis of the wheel is located along the rocker arm between the first and second ends; and a brake coupled to the axis of the front wheel, the brake is located between the rigid fork and the compression fork, wherein the brake is connected to the axis of the front wheel with a first support member and is connected to the rigid fork with a second support member;

wherein the centerline of the second support member and the center line of the rocker arm intersect at a horizontal position approximate a horizontal position of a center of gravity of the motorcycle.

2. A motorcycle front suspension system comprising:

a rigid fork downwardly extending from a steering head;

a compression fork downwardly extending from the steering head;

a rocker arm having a first end pivotally connected to the rigid fork and an opposite end pivotally connected to the compression fork;

a front wheel rotatably mounted to the rocker aim such that an axis of the wheel is located along the rocker arm between the first and second ends; and a brake located between the rigid fork and the compression fork, the brake is coupled to the axis of the front wheel with a first support member and is coupled to the rigid fork with a second support member, such that a portion of the rigid fork, the rocker arm, and the first and second support members form an irregular quadrilateral during vertical movement of the front wheel, and a centerline of the second support member and a centerline of the rocker arm intersect behind the front wheel axis;

wherein the centerline of the second support member and the centerline of the rocker arm intersect at a location approximately 30–40 inches behind the front wheel axis.

3. The motorcycle front suspension system of claim 2 wherein the first and second support members provide a force feedback to the rigid fork during braking to compensate for weight transfer during full compression fork travel.

4. The motorcycle front suspension system of claim 2 wherein the first support member comprises a brake caliper housing and a caliper mounting bracket.

5. The motorcycle front suspension system of claim 2 wherein the second support member is coupled to the rigid fork with a mounting plate.

6. A motorcycle suspension system comprising:

a rigid fork;

a rocker arm pivotally connected to the rigid fork at a first point;

a brake located forward of the rigid fork and pivotally connected at a second point to the rocker with a first support member, the brake is pivotally connected at a third point to the rigid fork with a second support member, the first and second support members are pivotally coupled together at a fourth point;

the first, second, third and fourth points form an irregular quadrilateral with W distance between the first and second points, X distance between the second and fourth points, Y distance between the third and fourth points, and Z distance between the third and first points; and a first line extending through the first and second points intersects a second line extending through the third and fourth points at a location behind the rigid fork;

wherein W=1.15Y, X=1.45Y and Z=1.67Y.

* * * * *